(12) United States Patent
Rodman et al.

(10) Patent No.: US 8,171,722 B2
(45) Date of Patent: May 8, 2012

(54) FLUID DELIVERY SYSTEM

(75) Inventors: Anthony Rodman, Langtoft (GB);
Ashutosh Katari, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 575 days.

(21) Appl. No.: 12/314,217

(22) Filed: Dec. 5, 2008

(65) Prior Publication Data
US 2010/0139260 A1    Jun. 10, 2010

(51) Int. Cl.
*F01N 3/10* (2006.01)
(52) U.S. Cl. .......................... 60/286; 60/295; 239/533.3
(58) Field of Classification Search .................. 60/286, 60/295; 239/533.3
See application file for complete search history.

(56) References Cited

U.S. PATENT DOCUMENTS

| | | | |
|---|---|---|---|
| 3,779,014 A | 12/1973 | Nohira et al. | |
| 5,783,160 A | 7/1998 | Kinugasa et al. | |
| 5,813,222 A * | 9/1998 | Appleby | 60/274 |
| 6,050,088 A * | 4/2000 | Brenner | 60/303 |
| 6,063,350 A | 5/2000 | Tarabulski et al. | |
| 6,637,196 B1 * | 10/2003 | Tost | 60/286 |
| 6,696,031 B1 | 2/2004 | Twigg et al. | |
| 6,871,490 B2 | 3/2005 | Liang et al. | |
| 6,882,929 B2 | 4/2005 | Liang et al. | |
| 7,168,241 B2 * | 1/2007 | Rudelt et al. | 60/286 |
| 7,404,290 B2 * | 7/2008 | Gaiser et al. | 60/289 |
| 7,448,207 B2 * | 11/2008 | Jozsa et al. | 60/286 |
| 7,584,604 B2 * | 9/2009 | Masaki et al. | 60/286 |
| 7,762,061 B2 * | 7/2010 | Birkby et al. | 60/286 |
| 7,849,675 B2 * | 12/2010 | Ripper et al. | 60/286 |
| 7,877,982 B2 * | 2/2011 | Schaller et al. | 60/286 |
| 7,886,525 B2 * | 2/2011 | Nishibu et al. | 60/286 |
| 2007/0175203 A1 | 8/2007 | Roozenboom | |
| 2008/0022657 A1 | 1/2008 | Pierpont et al. | |
| 2008/0098726 A1 | 5/2008 | Donaldson et al. | |
| 2008/0202097 A1 | 8/2008 | Driscoll et al. | |

FOREIGN PATENT DOCUMENTS

WO    WO 98/28070    7/1998

OTHER PUBLICATIONS

U.S. Appl. No. 12/081,894, filed Apr. 23, 2008, 24 pages.

* cited by examiner

*Primary Examiner* — Kenneth Bomberg
*Assistant Examiner* — Matthew T Largi
(74) *Attorney, Agent, or Firm* — Finnegan, Henderson, Farabow, Garrett & Dunner LLP (57) ABSTRACT

A fluid delivery system for supplying fluid to an exhaust stream of a power source is disclosed. The fluid delivery system includes a supply manifold and a plurality of supply exit orifices fluidly linked to the supply manifold to allow the fluid to exit the manifold to the exhaust stream.

19 Claims, 5 Drawing Sheets

FLUID DELIVERY SYSTEM

TECHNICAL FIELD

The present disclosure is directed to a fluid delivery system, and more particularly, a fluid delivery system for supplying fluid for an exhaust stream of a power source.

BACKGROUND

Engines, including diesel engines, gasoline engines, natural gas engines, and other engines known in the art, may exhaust a complex mixture of air pollutants. The air pollutants may be composed of both solid materials, such as, for example, particulate matter, and gaseous material, which may include, for example, oxides of nitrogen, such as NO and $NO_2$ (commonly referred to collectively as "$NO_x$").

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection control, engine management, and air induction, to name a few.

In addition, engine manufacturers have developed devices for treatment of engine exhaust after it leaves the engine (sometimes referred to as "after-treatment"). For example, engine manufacturers have employed exhaust treatment devices that utilize catalysts to convert one or more components of the exhaust to different, more environmentally-friendly compounds. Catalyst-based exhaust treatment devices have been developed for reducing or removing $NO_x$ from the exhaust stream. In some systems, $NO_x$ may be reduced by selective catalytic reduction (commonly referred to as "SCR"). In such systems, a gaseous or liquid reductant (most commonly urea, a urea/water solution, or a hydrocarbon, for example, diesel fuel, and/or ammonia gas ($NH_3$)) may be added to a catalyst-based device, where it is chemically broken down into ammonia ($NH_3$) that is then stored in (or on) the catalyst. The ammonia stored in the catalyst reacts with $NO_x$ in the exhaust stream to convert the $NO_x$ to Nitrogen ($N_2$) and water ($H_2O$).

Although SCR can be an effective method for reducing $NO_x$, it can also be difficult to ensure that the reductant has been uniformly distributed to the catalyst to adequately reduce the amount of $NO_X$ present within the exhaust gas stream.

One attempt to uniformly distribute the injection of reductant is described in PCT Application Publication No. WO 98/28070 (the '070 publication) to Peter-Hoblyn et al. published on Jul. 2, 1998. The '070 publication discloses an exhaust system for reducing $NO_X$ emissions from a lean-burn engine, such as a diesel engine. The exhaust system includes an exhaust pipe of an engine and an SCR catalyst located within the exhaust pipe. The exhaust system also includes a plurality of injectors positioned on the exhaust pipe. Supply lines feed each injector an aqueous urea solution after being heated by a separate heating element, and the injectors are configured to inject the aqueous urea solution into the exhaust pipe upstream of the SCR catalyst.

Although the method of the '070 publication may provide improved mixing of a reductant injected into an exhaust stream, it may have limitations. For example, having multiple supply lines to feed a reductant to the injectors may create an uneven distribution of the reductant to each injector, which may in turn produce a non-uniform distribution of reductant injected into the exhaust stream. In addition, multiple feed lines may increase the chance of complications associated with reductant delivery to the injectors.

The fluid delivery system of the present disclosure is directed towards improvements to the existing technology.

SUMMARY OF THE DISCLOSURE

One aspect of the present disclosure is directed to a fluid delivery system for supplying fluid to an exhaust stream of a power source. The fluid delivery system may include a supply manifold and a plurality of supply exit orifices fluidly linked to the supply manifold to allow the fluid to exit the manifold to the exhaust stream.

Another aspect of the present disclosure is directed to a method for delivering a reductant into an exhaust stream of an engine. The method may include supplying a manifold with the reductant and injecting the reductant from the manifold into the exhaust stream through a plurality of orifices at substantially the same reductant pressure.

DETAILED DESCRIPTION

Figure 1:
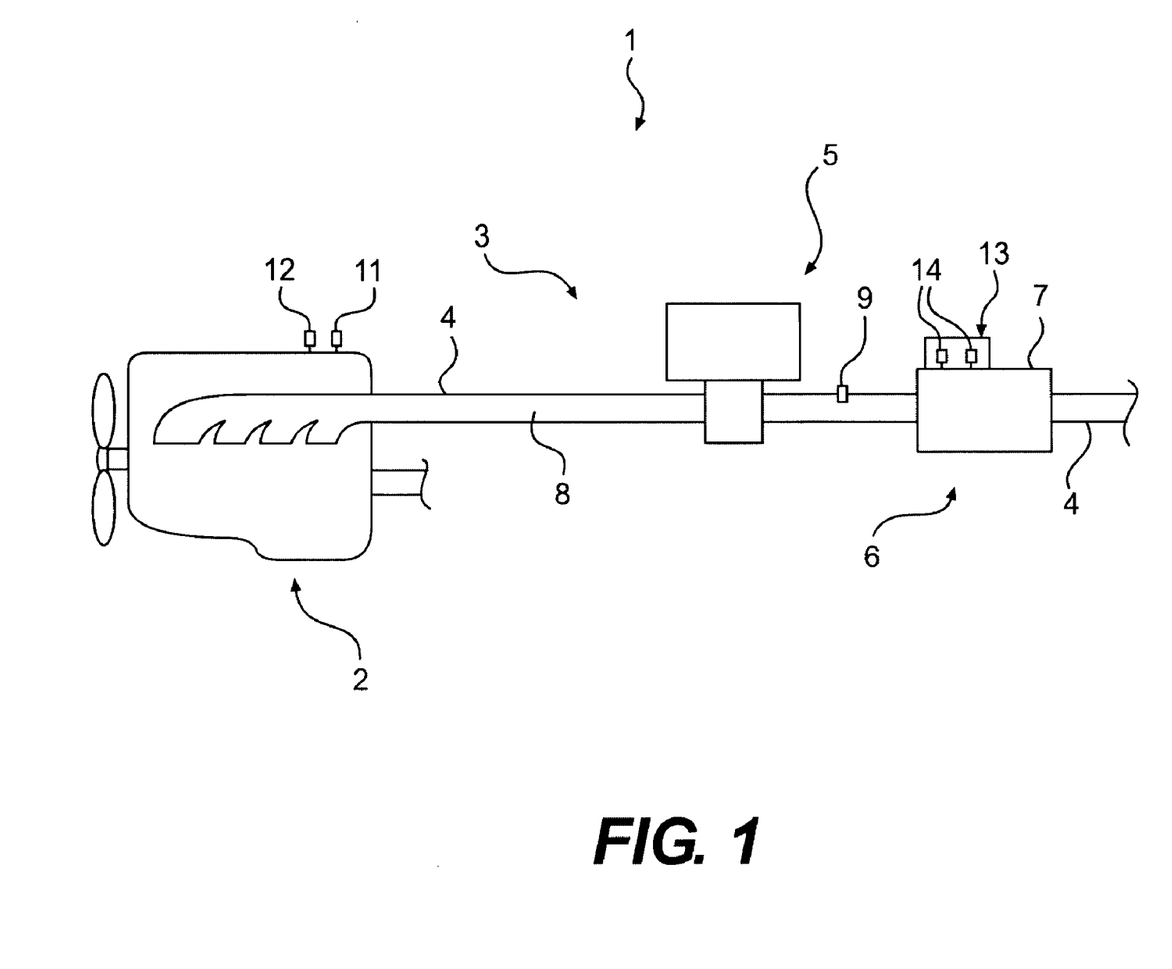
FIG. 1 is a diagrammatic illustration of a power system according to an exemplary disclosed embodiment.

FIG. 1 illustrates an exemplary power system 1. Power system 1 may include an exhaust producing engine 2 and an exhaust treatment system 3 configured to reduce the amount of one or more constituents of the exhaust produced by engine 2. For the purposes of this disclosure, engine 2 is depicted and described as a diesel-fueled, internal combustion engine. However, it is contemplated that engine 2 may embody any type of combustion engine, such as, for example, a gasoline or a gaseous fuel-powered engine or any other kind of engine that produces an exhaust flow of exhaust gases. Engine 2 may be naturally aspirated, or in other embodiments, may utilize forced induction (e.g., turbocharging or supercharging).

Exhaust treatment system 3 may include, among other things, an exhaust conduit 4, a reductant delivery system 5, and an after-treatment device 6. Reductant delivery system 5 may be associated with exhaust conduit 4 downstream of engine 2, and after-treatment device 6 may be associated with exhaust conduit 4 downstream of reductant delivery system 5.

After-treatment device 6 may include, for example, a catalyst-based device 7 (e.g., a catalytic converter). Catalyst-based device 7 may include a catalyst configured to convert (e.g., via oxidation or reduction) one or more gaseous constituents of an exhaust stream 8 produced by engine 2 to a more environmentally friendly gas and/or compound to be discharged into the atmosphere. For example, the catalyst may be configured to chemically alter at least one component of exhaust stream 8. Catalyst-based device 7 may be configured for select catalytic reduction (SCR). Additionally or alternatively, catalyst-based device 7 may be configured for diesel oxidation (e.g., a diesel oxidation catalyst, DOC) and/or absorption of nitrous oxides ($NO_x$; e.g., a $NO_x$ adsorber).

Reductant delivery system 5 may be configured to inject a reductant into exhaust stream 8. The reductant may include a gaseous or liquid reductant, such as urea (($NH_2$)2CO), a water/urea mixture, or a hydrocarbon, for example, diesel fuel, and/or ammonia gas ($NH_3$). The reductant may be injected, sprayed, or otherwise advanced into exhaust conduit 4 upstream of catalyst-based device 7. As the reductant is absorbed onto the surface of the catalyst of catalyst-based device 7, the reductant stored in or on the catalyst may alter the composition of one or more gaseous constituents of exhaust stream 8. For example, a urea/water solution may be injected by reductant delivery system 5 and added to catalyst-based device 7. The urea/water solution may be broken down into ammonia ($NH_3$) that is stored in (or on) the catalyst of catalyst-based device 7. The ammonia stored in the catalyst may react with $NO_x$ (NO or $NO_2$) in exhaust stream 8 to thereby convert the $NO_x$ to Nitrogen ($N_2$) and water ($H_2O$).

It is understood that reductant delivery system 5 may alternatively or additionally supply a different fluid to after-treatment device 6. Such a fluid could include any fluid that can assist in reducing the pollutants in the engine exhaust. For example, a fluid including additives for reducing a regeneration temperature of an after-treatment device 6 in the form of a diesel particulate filter.

A temperature sensor 9 may be associated with exhaust conduit 4 and configured to detect a temperature associated with exhaust stream 8 of exhaust conduit 4. In one embodiment, temperature sensor 9 may be configured to detect a temperature of exhaust stream 8 upstream from after-treatment device 6, as illustrated in FIG. 1.

Exhaust treatment system 3 may also include a speed sensor 11. Speed sensor 11 may be configured to detect and generate a signal indicative of a speed of engine 2. For example, speed sensor 11 may be configured to sense the rate at which a crankshaft of engine 2 is rotating.

A load sensor 12 may also be associated with engine 2 and configured to detect and generate a signal indicative of engine load or the amount of work being performed by engine 2. For example, load sensor 12 may include a mass air-flow sensor (MAF sensor) configured to determine the mass of intake air entering engine 2, and from that, determine a load on the engine 2. Additionally, or alternatively, engine load may be modeled and determined based on engine speed and fuel delivery to engine 2.

Exhaust treatment system 3 may also include a sensor system 13 associated with catalyst-based device 7. Sensor system 13 may include one or more sensors 14 configured to sense and generate signals indicative of properties of catalyst-based device 7 and the catalyst. For example, sensors 14 may sense the temperature of exhaust stream 8 within catalyst-based device 7 and the brick temperature of the catalyst. Sensor system 13 may also include constituent sensors configured to sense the presence of particular constituents within exhaust stream 8. For example, sensor system 13 may include an ammonia sensor and a $NO_x$ sensor configured to determine an amount (i.e., quantity, relative percent, ratio, etc.) of ammonia and $NO_x$ present in exhaust stream 8 within catalyst-based device 7. Sensors 14 may also sense the pressure of exhaust stream 8 within catalyst-based device 7.

Figure 2:
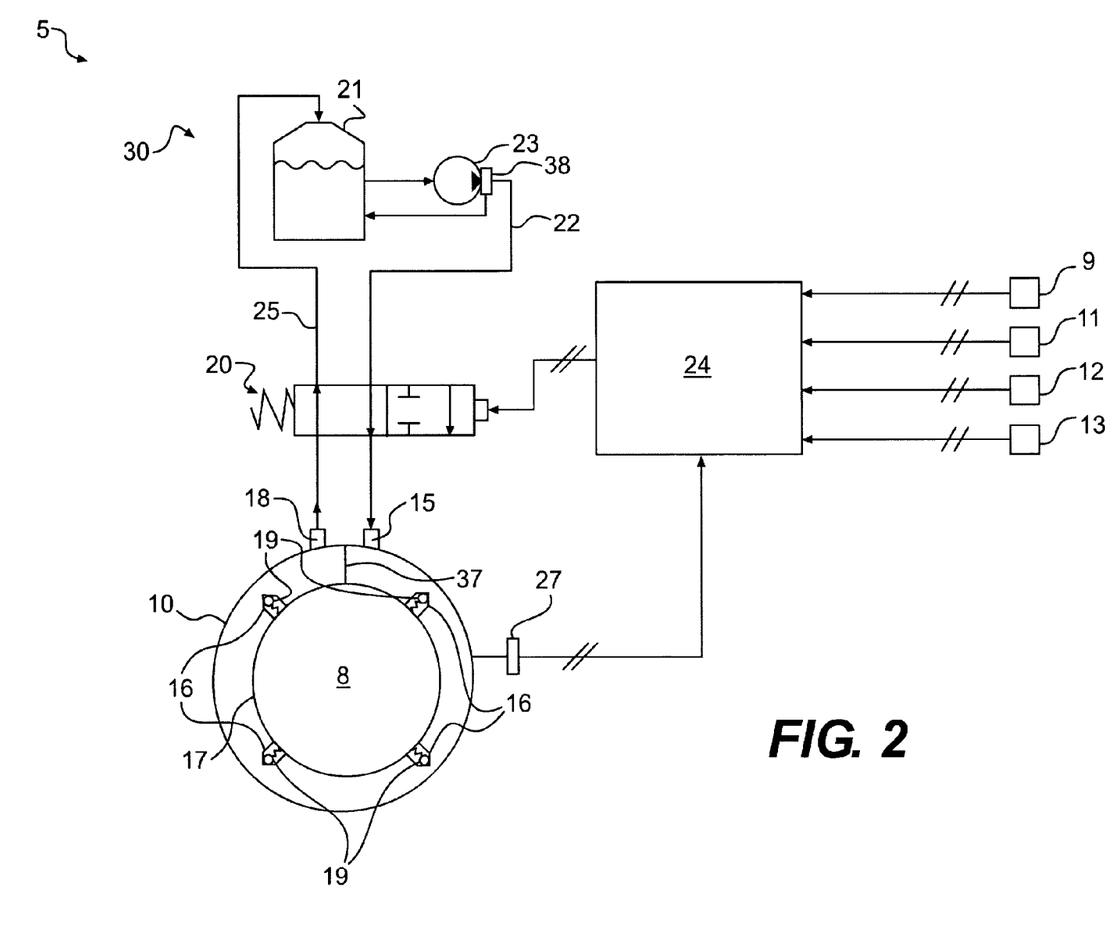
FIG. 2 is a diagrammatic illustration of a reductant delivery system for use in the exemplary disclosed power system of FIG. 1.
Figure 3:
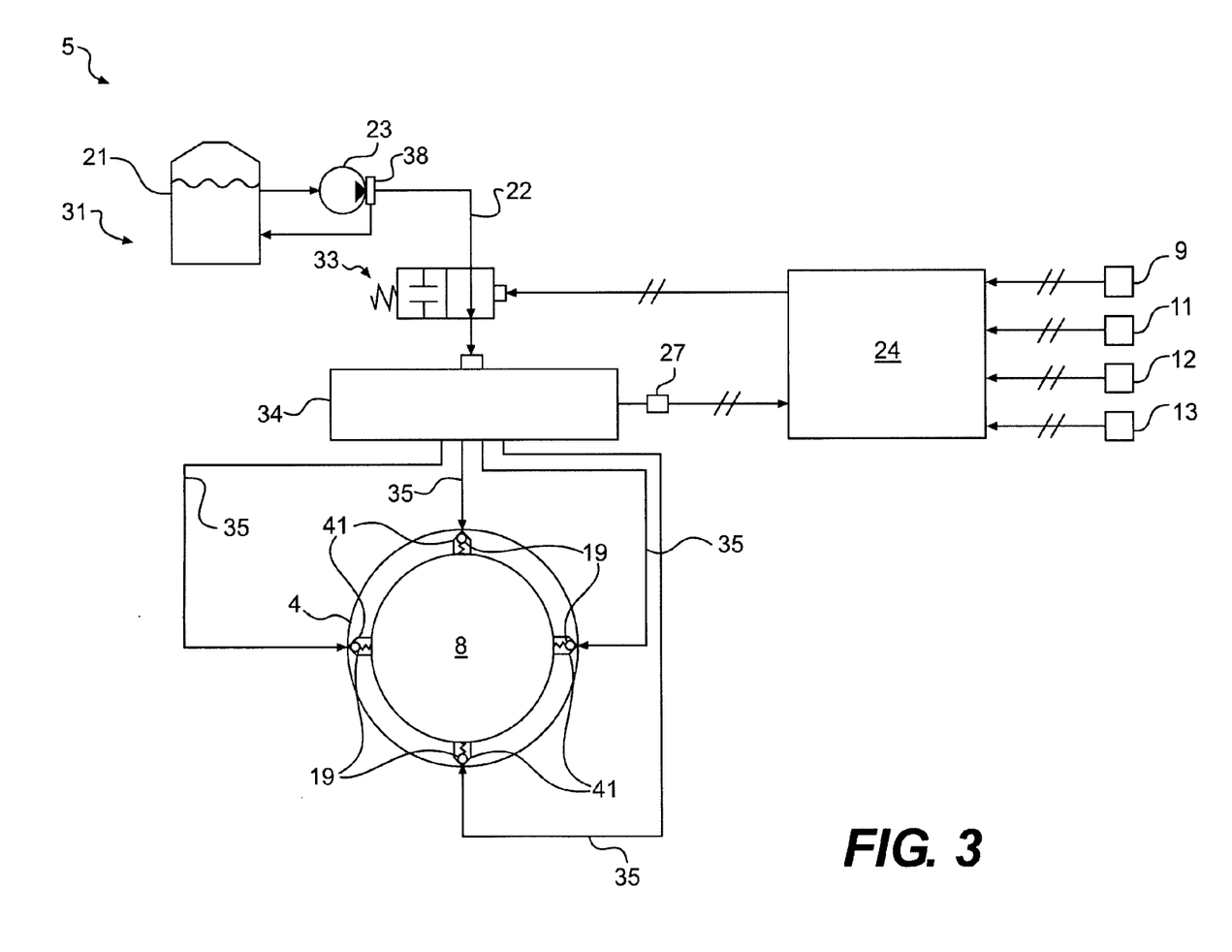
FIG. 3 is a diagrammatic illustration of another embodiment of a reductant delivery system for use in the exemplary disclosed power system of FIG. 1.
Figure 4:
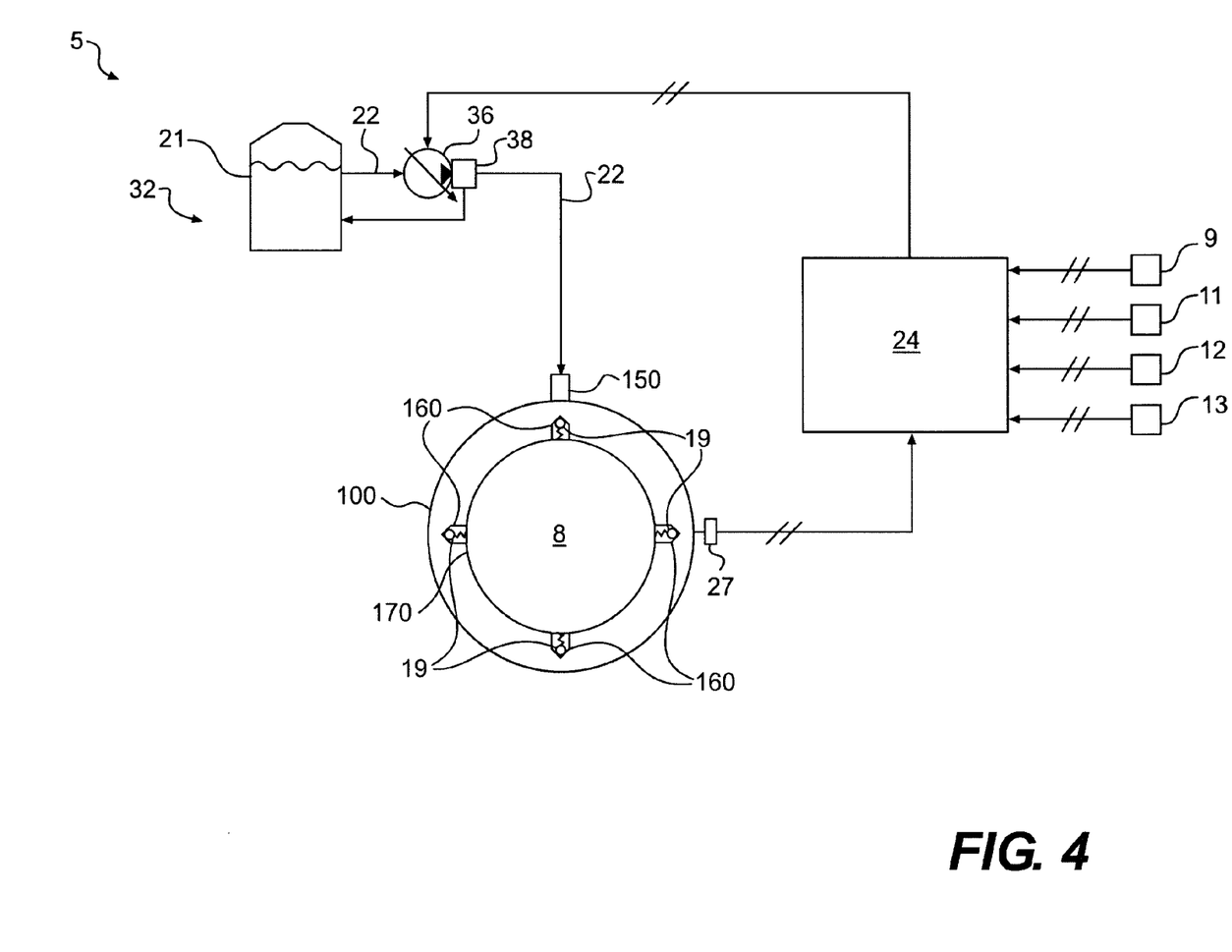
FIG. 4 is a diagrammatic illustration of another embodiment of a reductant delivery system for use in the exemplary disclosed power system of FIG. 1.

Exemplary embodiments of reductant delivery system 5 are illustrated in FIG. 2, FIG. 3, and FIG. 4. With reference to FIG. 2, reductant delivery system 5 may include a reductant supply system 30. Reductant supply system 30 may include a supply tank 21, a pump 23, a supply line 22, a return line 25, and at least one control valve 20.

A manifold 10 may be coupled downstream of reductant supply system 30. Manifold 10 may include an inlet 15 fluidly coupled to manifold 10 and a plurality of orifices 16 fluidly linked to manifold 10 and configured to inject reductant into exhaust stream 8. Manifold 10 may embody a substantially annular shape and include an internal surface 17. Manifold 10 may be coupled to exhaust conduit 4. For example, and as shown in FIG. 2, manifold 10 may be integral with exhaust conduit 4, where internal surface 17 of manifold 10 may be a portion of the inner wall of exhaust conduit 4. Additionally, or alternatively, manifold 10 may be positioned around the outer wall of exhaust conduit 4, where internal surface 17 of manifold 10 surrounds the outer wall of conduit 4. Apertures may be provided on the outer wall of exhaust conduit 4 and may be aligned with orifices 16 of manifold 10. Manifold 10 may also include an outlet 18 fluidly coupled to manifold 10. Although shown substantially adjacent to each other in FIG. 2, it should be appreciated that inlet 15 and outlet 18 may be positioned anywhere along the outer circumference of manifold 10. For example, inlet 15 and outlet 18 may be positioned between 0° (i.e., substantially aligned) to 180° (i.e. substantially across) from each other. An internal wall 37 may be positioned between inlet 15 and outlet 8 and direct fluid unidirectionally from inlet 15, internally around manifold 10, and to outlet 18.

Orifices 16 of manifold 10 may be located around internal surface 17, wherein the distances between each orifice 16 around the circumference of internal surface 17 may be substantially equal. For example, and as shown in FIG. 2, manifold 10 may include four orifices 16 positioned 90° apart from each other. Each orifice 16 may include a check valve 19 located within orifice 16 and configured to direct the injection of the reductant into exhaust stream 8. Check valves 19 may selectively direct the flow of the reductant into exhaust stream 8 when pressure within manifold 10 exceeds the minimum operating or valve opening pressure of check valves 19. The minimum operating pressure of each check valve 19 of manifold 10 may be substantially equally. Check valves 19 may be, for example, a ball check valve; however, it should be appreciated that a variety of known types of valves may be capable of selectively directing the reductant into exhaust stream 8 and that any conventional valve may be employed.

Orifices 16 may be radially aligned along internal surface 17 of manifold 10. In addition or alternatively, orifices 16 may be radially skewed such that orifices 16 may be oriented at an angle with the radius of manifold 10. For example, orifices 16 may be oriented substantially perpendicular with the longitudinal axis of exhaust stream 8 and skewed relative to the radius of the manifold 10. Orifices 16 may also be, for example, skewed relative the longitudinal axis of exhaust stream 8 and be oriented with or against the flow of exhaust gas. Although four orifices 16 are shown in FIG. 2, it should be appreciated that manifold 10 may include two or more orifices 16 equidistantly located around internal surface 17 of manifold 10.

Supply tank 21 may store the reductant and pump 23 may supply the reductant from supply tank 21 to control valve 20 via supply line 22. Pump 23 may be, for example, a fixed displacement pump capable of moving an aqueous solution of the reductant from supply tank 21 at a fixed, predetermined pressure greater than the valve opening pressure of check valves 19. A pressure relief valve 38 may be associated with supply line 22 and may limit the pressure of reductant supplied by pump 23. If the pressure of reductant supplied by pump 23 exceeds the predetermined pressure, the supply of reductant may be diverted back to supply tank 21.

Control valve 20 may be configured to control the supply of reductant into manifold 10 and may be, but not limited to, for example, a two-position solenoid valve as shown. When control valve 20 is in a circulate position, as illustrated in FIG. 2, the reductant supply may be circulated through reductant supply system 30. The reductant may enter inlet 15 and internally circulate around manifold 10. Wall 37 may direct the flow of reductant in a clockwise direction from inlet 15 to outlet 18. It is also contemplated that the flow or reductant may be directed in a counterclockwise direction by switching the positions of inlet 15 and outlet 18. The reductant may exit outlet 18 and enter return line 25 via control valve 20. The reductant may then be supplied back to supply tank 21. By continually circulating the reductant supply through reductant supply system 30, the reductant supply may be evenly heated by the heat radiated from exhaust stream 8, preventing temperature fluctuations of the reductant. Although the outlet pressure of pump 23 may be greater than the valve opening pressure of check valves 19, valves 19 will remain closed because the reductant exits manifold 10 without exerting a pressure equal to or greater than the valve opening pressure onto valves 19. The fluid passageways of outlet 18, control valve 20, and return line 25 may therefore be of appropriate dimensions to minimize resistance to reductant flow. Although not shown in FIG. 2, it should be appreciated that supply line 22 and return line 25 may be coupled to, for example, wrapped around, the outer surface of manifold 10 or exhaust conduit 4 to provide further heat exchange contact with the reductant. Thus, heat from exhaust stream 8 and the recirculation the reductant may maintain the reductant in the aqueous state and prevent a phase change of the reductant to a solid.

A controller 24 may be in communication with, among other things, control valve 20 and may control actuation of control valve 20. Controller 24 may actuate control valve 20 from the circulate position to the inject position. In the inject position, control valve 20 may direct the reductant supply into manifold 10 via inlet 15 while blocking the flow of the reductant from exiting outlet 18. Thus, the reductant pressure within manifold 10 may increase towards the outlet pressure supplied by pump 23. Once the reductant pressure reaches or exceeds the valve opening pressure of the check valves 19, valves 19 may be urged opened and the reductant may be injected and sprayed into exhaust stream 8. In addition, controller 24 may manipulate the pressure of the reductant injected into exhaust stream 8 by controlling the amount of time control valve 20 is in the inject position. As control valve 20 is maintained in the inject position, the reductant pressure within manifold 10 may build up, and the reductant pressure injected into exhaust stream 8 may gradually increase towards the outlet pressure of pump 23.

With reference to FIG. 3, reductant delivery system 5 may alternatively include a reductant supply system 31. Reductant supply system 31 may include supply tank 21, pump 23, supply line 22, and a control valve 33. A manifold 34 and a plurality of exit orifices 41 separate from manifold 34 may be coupled downstream of reductant supply system 31. One or more supply lines 35 may couple manifold 34 to orifices 41 and may supply reductant from manifold 34 to orifices 41. Orifices 41 may be coupled directly to exhaust conduit 4 and may each include check valve 19 located within orifice 41 and configured to direct the injection of the reductant into exhaust stream 8. In a similar manner as described above in the embodiment of FIG. 2, orifices 41 may be radially skewed such that orifices 41 may be oriented at an angle with the radius of exhaust conduit 4 or the longitudinal axis of exhaust conduit 4. Check valves 19 may selectively direct the flow of the reductant into exhaust stream 8 when pressure supplied from manifold 34 exceeds the minimum operating or valve opening pressures of check valves 19. The minimum operating pressures of each check valve 19 may be substantially equally. The plurality of check valves 19 may provide an airless injection of the reductant at a common pressure. Pump 23 may pump reductant from supply tank 21, at a fixed, predetermined pressure greater than the valve opening pressures of check valves 19, to control valve 33 via supply line 22. Pressure relief valve 38 may also be associated with supply line 22 and may limit the pressure of reductant supplied by pump 23. Although not shown in FIG. 3, it should be appreciated that supply line 22 and supply lines 35 may be coupled to, for example, wrapped around, the outer surface of exhaust conduit 4 provide heat exchange contact with the reductant. Controller 24, in communication with control valve 33, may actuate control valve 33 between a closed position and an open position, the open position being illustrated in FIG. 3. In the closed position, control valve 33 may block the reductant supply from entering manifold 34, and thus preventing the injection of reductant injected from orifices 41. In the open position, control valve 33 may permit the reductant supply to enter manifold 34. The reductant may exit manifold 34 and enter each supply line 35. The reductant pressure within manifold 34 and supply lines 35 may increase toward the outlet pressure of pump 23. Check valves 19 may open once the reductant pressure acting on check valves 19 reaches or exceeds the valve opening pressures, injecting reductant into exhaust stream 8. Similarly, as described above in the embodiment of FIG. 2, controller 24 may manipulate the pressure of the reductant injected into exhaust stream 8 by controlling the amount of time control valve 33 is in the open position.

Referring to the embodiment shown in FIG. 4, reductant delivery system 5 may alternatively include a reductant supply system 32. Reductant supply system 32 may include supply tank 21, a pump 36, and supply lines 22. A manifold 100 may be coupled downstream of reductant supply system 32. Manifold 100 may include an inlet 150 fluidly coupled to manifold 100 and a plurality of orifices 160 fluidly linked to manifold 100 and configured to inject reductant into exhaust stream 8. Manifold 100 may embody a substantially annular shape and include an internal surface 170. Manifold 100 may be coupled to exhaust conduit 4. For example, manifold 100 may be integral with exhaust conduit 4, where internal surface 170 of manifold 100 may be a portion of the inner wall of exhaust conduit 4. Additionally, or alternatively, manifold 100 may be positioned around the outer wall of exhaust conduit 4, where internal surface 170 of manifold 100 surrounds the outer wall of conduit 4. Apertures may be provided on the outer wall of exhaust conduit 4 and may be aligned with orifices 160 of manifold 100.

Orifices 160 of manifold 100 may be located around internal surface 170, wherein the distances between each orifice 160 around the circumference of internal surface 170 may be substantially equal. For example, manifold 100 may include four orifices 160 positioned 90° apart from each other. In a similar manner as described above in the embodiment of FIG. 2, orifices 160 may be radially skewed such that orifices 160 may be oriented at an angle with the radius of exhaust conduit 4 or the longitudinal axis of exhaust conduit 4. Each orifice 160 may include check valve 19 located within orifice 160 and configured to direct the injection of the reductant into exhaust stream 8. Check valves 19 may selectively direct the flow of the reductant into exhaust stream 8 when pressure within manifold 100 exceeds the minimum operating or valve opening pressure of check valve 19. The minimum operating pressure of each check valve 19 of manifold 100 may be substantially equally.

Reductant supply system 32 may direct the reductant to manifold 100 and without recirculating the reductant through reductant supply system 32 as in the reductant supply system 30 of FIG. 2. In the embodiment of FIG. 4, controller 24 may send a signal to pump 36 to activate pump 36 and control the supply of the reductant to supply line 22. In particular, controller 24 may control the displacement of pump 36 to maintain a desired pressure in line 22 and manifold 100, thereby controlling the reductant pressure injected into exhaust stream 8. This may be achieved by any conventional manner, such as via an inlet or outlet metered variable displacement pump. In this embodiment, pressure relief valve 38 may also be included downstream of pump 36 to ensure that the reductant pressure in line 22 and/or manifold 100 does not exceed a threshold level. Controller 24 may also deactivate pump 36, stopping the supply of reductant to manifold 100. As discussed above, supply line 22 may similarly be coupled to manifold 10 or exhaust conduit 4 to provide heat exchange contact with the reductant.

As shown in FIGS. 2, 3, and 4, controller 24 may be in communication with temperature sensor 9, speed sensor 11, load sensor 12, sensor system 13, pump 23, and a pressure sensor 27. Pressure sensor 27 may be associated with manifold 10 (FIG. 2), manifold 34 (FIG. 3), and manifold 100 (FIG. 4) and configured to sense and generate a signal indicative of a pressure of the reductant in manifold 10, manifold 34, and manifold 100. Based on input from each sensor, controller 24 may actuate control valve 20 (FIG. 2), control valve 33 (FIG. 3), and pump 36 (FIG. 4) and modify the pressure of the reductant and thus the pressure and amount of the reductant injected into exhaust stream 8.

Controller 24 may embody a single or multiple microprocessors, field programmable gate arrays (FPGAs), digital signal processors (DSPs), etc. that include a means for controlling the operation of reductant supply systems 30 (FIG. 2), 31 (FIG. 3), and 32 (FIG. 4), such as control valves 20 (FIG. 2) and 33 (FIG. 3) and pumps 23 (FIGS. 2 and 3) and 36 (FIG. 4). Numerous commercially available microprocessors may be configured to perform the functions of controller 24. It should be appreciated that controller 24 embody a microprocessor separate from that controlling other non-exhaust related power system functions, or that controller 24 may be integral with a general power system microprocessor and be capable of controlling numerous power system functions and modes of operation.

As discussed above, temperature sensor 9 of exhaust treatment system 3 may sense and deliver a signal to controller 24 indicative of the temperature associated with exhaust stream 8. The temperature of exhaust stream may be utilized by controller 24 to determine when to inject reductant into exhaust stream 8. That is, if the temperature of exhaust stream 8 is appropriate for supplying reductant. For example, for a reductant comprising a urea/water solution, the appropriate temperature range for injecting the reductant may be in the range of 140° C. to 400° C. to prevent any undesirable phase changes or composition changes of the urea/water solution. Temperatures below 140° C. may convert the urea/water solution to a solid, while temperatures above 400° C. may convert the urea/water solution to a polymer.

Sensor system 13 may sense and generate signals indicative of properties of catalyst-based device 7. Controller 24 may utilize the signals to develop a coverage model of the catalyst. The coverage model may indicate a current value of ammonia coverage or absorption by the catalyst. For example, the coverage model may indicate a ratio of the catalyst that is covered by ammonia to that which is uncovered. Controller 24 may then utilize the coverage model to control reductant injection into exhaust stream 8. For example, if the coverage model determines that the ratio of ammonia covered to uncovered of the catalyst is 1:1, controller 24 may control the reductant pressure within manifold 10, manifold 34, and manifold 100 to pressures below the valve opening pressures of check valves 19. As noted above, the control of reductant pressure in manifold 10 may be achieved by control valve 20, reductant pressure in manifold 34 may be controlled by control valve 33, and reductant pressure in manifold 100 may be controlled by pump 36. However, if the ratio of covered to uncovered is less than 1:1, controller 24 may control the reductant pressures in manifold 10, manifold 34, and manifold 100 to pressures above the valve opening pressures of check valves 19. This will cause reductant to be injected into exhaust stream 8 and absorbed on the catalyst.

Once controller 24 has determined that the reductant should be injected into exhaust stream 8, controller 24 may utilize the signals from speed sensor 11 and load sensor 12 to modify the pressure of the reductant in manifold 10, manifold 34, and manifold 100 based on the signals. For example, at high engine speeds and high engine loads, a higher manifold pressure may be required to inject the reductant into exhaust stream 8.

Referring to FIG. 2, and as discussed above, controller 24 may increase reductant pressure in manifold 10 by maintaining control valve 20 in the inject position for an extended period. Reductant pressure may exceed the valve opening pressure of check valves 19 and increase toward the outlet pressure of pump 23. Controller 24, in communication with pressure sensor 27, may monitor reductant pressure within manifold 10, and thus the reductant pressure being injected into exhaust stream 8, and may continue to increase the reductant pressure and injection by maintaining control valve 20 in the inject position. Once the coverage ratio of the catalyst is significantly 1:1, controller 24 may terminate reductant injection by actuating control valve 20 to the circulate position. At low to intermediate engine speeds and low to intermediate engine loads, control valve 20 may be positioned in the inject position for a shorter duration after manifold pressure has exceeded the crack pressures of control valves 19. The amount of reductant injected into exhaust stream 8 may be controlled by the frequency at which controller 24 actuates control valve 20 from the circulate position to the inject position, while the reductant pressure injected into exhaust stream 8 may be controlled by the duration at which control valve 20 is positioned in the inject position.

A similar control strategy may be employed by controller 24 in the embodiment of FIG. 3. Controller 24 may instead tailor the reductant injection pressure by controlling the duration at which control valve 33 is in the open position.

With reference to FIG. 4, controller 24 may regulate the displacement of pump 36 in response to engine speeds and loads. The reductant pressure injected into exhaust stream 8 may be tailored by pump 36 to be within a range of, for example, 5-50 bar, wherein pressures may be decreased toward 5 bar at lower engine speeds and loads and may be increased toward 50 bar at higher engine speeds and loads. As noted above, reductant pressure may also be monitored by pressure sensor 27.

By injecting the reductant at low pressures under conditions of low to intermediate engine speeds and loads, reductant delivery system 5 may prevent an over-pressurized injection of the reductant which may collide with the inner wall of exhaust conduit 4. By injecting the reductant at high pressures under conditions of high engine speeds and loads, the injected reductant may effectively penetrate exhaust stream 8. Therefore, tailoring and modifying the reductant pressure may provide a uniform distribution of the reductant when injected into exhaust stream 8 at varying engine operating conditions.

Industrial Applicability

The disclosed exhaust treatment system 3 may be applicable to any power system having any after-treatment system. For example, any after-treatment system where supply of fluid can assist in reducing exhaust pollutants. Such a system may include a liquid reductant added to or on a catalyst within the exhaust stream, where it reacts with exhaust pollutants and converts the exhaust pollutants to more environmentally-friendly compounds.

Figure 5:
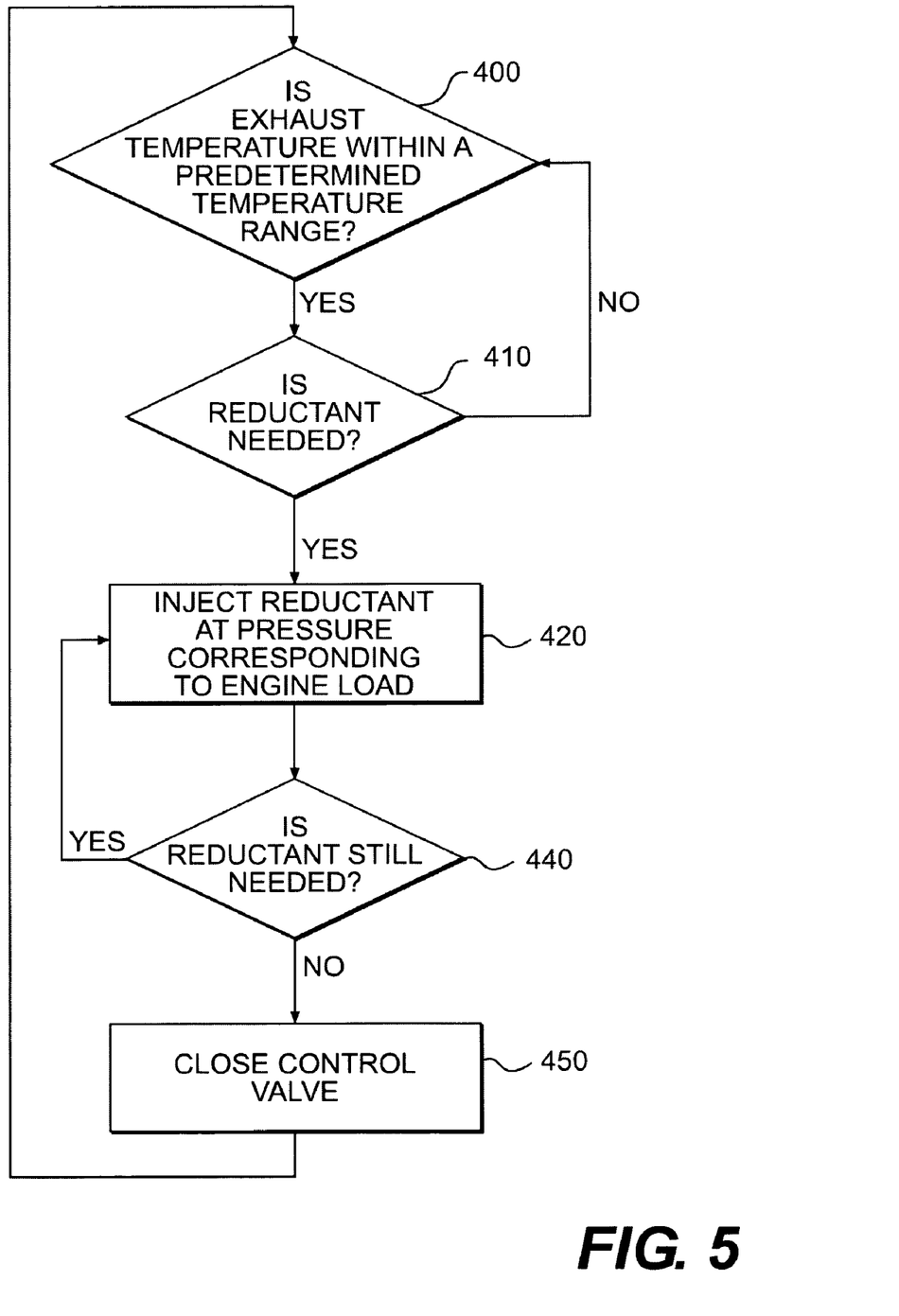
FIG. 5 is a flow chart illustrating a reductant delivery system logic according to an exemplary disclosed embodiment.

FIG. 5 is a block diagram illustrating injection control of reductant delivery system 5. Temperature sensor 9 may sense the temperature of exhaust stream 8 and deliver and appropriate signal to controller 24. Controller 24 may monitor the temperature of exhaust stream 8 and determine if the temperature is suitable for reductant injection, for example, if the temperature is between a predetermined range (step 400). Once the temperature of exhaust stream 8 is determined to be suitable for reductant injection, controller 24 may determine if the catalyst of catalyst-based device 7 requires reductant (step 410). As described above, controller 24 may utilize signals from sensor system 13 to develop a coverage model of the catalyst indicative of a value of coverage or absorption of, for example ammonia, by the catalyst of catalyst-based device 7. If the coverage model indicates that the catalyst is substantially covered, controller 24 may continue to monitor the temperature of exhaust stream 8 and coverage of the catalyst. If the coverage model indicates that the catalyst is not substantially covered, reductant may be injected into exhaust stream 8 at a pressure corresponding to engine load (step 420). For example, in the embodiment of FIG. 2, controller 24 may actuate control valve 20 to the inject position. For the embodiment of FIG. 3, controller 24 may actuate control valve 33 to the open position, and in FIG. 4, controller 24 may activate pump 36 and increase the reductant pressure pumped to manifold 100.

Controller 24 may then modify the pressure of the reductant supply to control the injection pressure into exhaust stream 8. For example, in the embodiments of FIGS. 2 and 3, controller 24 may control the duration for which control valve 20 (FIG. 2) and control valve 33 (FIG. 3) are in the inject position (FIG. 2) and the open position (FIG. 3), respectively. As described above, a longer duration may provide higher reductant injection pressures suitable for higher engine speeds and loads. For lower to intermediate engine speeds and loads, shorter durations in the inject position (FIG. 2) and the open position (FIG. 3) may provide lower reductant injection pressures. With regards to FIG. 4, controller 24 may alter the displacement of pump 36 to tailor the reductant pressure in response to engine speed and engine load signals. For example, at higher engine speeds and loads, controller 24 may signal pump 36 to increase the displacement and increase the injection pressure of the reductant from manifold 100. At lower engine speeds and loads, controller 24 may signal pump 36 to decrease the displacement and decrease the injection pressure of the reductant from manifold 100.

Controller 24 may continually update and monitor the coverage model of the catalyst and determine if reductant is needed (step 440). As shown in step 450, once the coverage model indicates that the catalyst is substantially covered, controller 24 may actuate control valve 20 (FIG. 2) and control valve 33 (FIG. 3) to the circulate position (FIG. 2) and the closed position (FIG. 3), respectively. In the embodiment of FIG. 4, controller 24 may alter the displacement of pump 36 to stop the supply of reductant delivered to manifold 100. Controller 24 may then reset to step 400 for the next injection event.

As described above, each orifice 16 of manifold 10 and each orifice 160 of manifold 100 may be controlled by check valve 19. The minimum operating or valve opening pressure of check valves 19 may be substantially equally; therefore, check valves 19 may provide an airless, simultaneous, and uniform injection of the reductant at a common pressure within manifold 10 and manifold 100. In addition, check valves 19 may be controlled by a common supply of the reductant, minimizing complications, such as pressure loss and malfunctions due to excess supply lines, which may cause an undesired non-uniform injection of the reductant.

In addition, because manifold 10 and manifold 100 may be associated with exhaust conduit 4, exhaust stream 8 may provide a heat source for the reductant within manifold 10 and manifold 100. Heat from exhaust stream 8 may maintain the reductant, such as a urea/water solution, in an aqueous state without the need of a separate heat exchanger associated with reductant delivery system 5. For example, during operation of engine 2, the exhaust stream 8 may heat the urea/water solution between 140° C. and 400° C.

Further, since reductant delivery system 5 may utilize a minimal amount of components, such as a single manifold 10 having a plurality of injection orifice 16, a single control valve, and a single, separate controller 24, the disclosed system is attractive for retrofitting onto existing engine systems.

It will be apparent to those skilled in the art that various modifications and variations can be made to the fluid delivery system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A fluid delivery system for supplying fluid to an exhaust stream of a power source, comprising:
 a supply tank configured to store reductant;
 an annular supply manifold configured to be located in an exhaust system and receive reductant supplied by the supply tank, the annular supply manifold including a circumferential passageway and configured to supply the reductant to an exhaust stream of a power source; and
 a plurality of supply exit orifices fluidly linked to the circumferential passageway to allow the reductant to exit the annular supply manifold to the exhaust stream,
 wherein the annular supply manifold further includes:
  an inlet to the circumferential passageway configured to receive the reductant from the supply tank,
  an outlet to the circumferential passageway configured to direct the reductant from the annular supply manifold back to the supply tank, and
  an internal wall in the circumferential passageway separating the inlet from the outlet such that the reductant is configured to flow unidirectionally from the inlet, around the circumferential passageway, and to the outlet.

2. The fluid delivery system of claim 1, wherein the plurality of supply exit orifices are located equidistantly around the annular supply manifold.

3. The fluid delivery system of claim 2, wherein the plurality of supply exit orifices are located around an internal surface of the annular supply manifold.

4. The fluid delivery system of claim 3, further including a check valve located within each of the plurality of supply exit orifices, wherein the check valves have substantially the same valve opening pressures.

5. The fluid delivery system of claim 1, wherein the plurality of supply exit orifices are separate from the annular supply manifold, and wherein a plurality of supply lines fluidly couple the supply exit orifices to the annular supply manifold.

6. The fluid delivery system of claim 1, further including a variable displacement pump configured to control a pressure of the reductant supplied to the annular supply manifold.

7. The fluid delivery system of claim 1, further including at least one control valve configured to control a pressure of the reductant supplied to the annular supply manifold.

8. The fluid delivery system of claim 1, wherein the internal wall blocks a first flow path through the circumferential passageway between the inlet and the outlet leaving a second flow path through the circumferential passageway that is longer than the first flow path.

9. A reductant delivery system for an after-treatment system of an engine system, comprising:
   a reductant supply system including a supply tank configured to store reductant; and
   a manifold having a circumferential passageway that is fluidly coupled to the reductant supply system, the manifold including;
      an inlet to the circumferential passageway;
      a plurality of orifices connected to the circumferential passageway, the orifices configured to inject the reductant from the supply tank into an engine exhaust stream,
      an outlet configured to direct the reductant from the circumferential passageway back to the supply tank, and
      an internal wall in the circumferential passageway fluidly separating the inlet from the outlet such that the reductant is configured to pass from the inlet, around the circumferential passageway in the supply manifold, and to the outlet.

10. The reductant delivery system of claim 9, wherein the reductant supply system includes a pump configured to direct the reductant from the supply tank to the inlet of the manifold.

11. The reductant delivery system of claim 10, wherein the pump is a variable displacement pump.

12. The reductant delivery system of claim 10, further including a return line located between the outlet and the supply tank, the return line being configured to direct the reductant from the manifold to the supply tank.

13. The reductant delivery system of claim 9, wherein the reductant supply system includes at least one control valve configured to control a supply of the reductant to the inlet of the manifold and a controller configured to control actuation of the at least one control valve as a function of a load on an engine of the engine system.

14. The reductant delivery system of claim 9, wherein the internal wall blocks a first flow path through the circumferential passageway between the inlet and the outlet leaving a second flow path through the circumferential passageway that is longer than the first flow path.

15. The reductant delivery system of claim 9, wherein the manifold is annular in shape.

16. A method for delivering a reductant from a tank into an exhaust stream of an engine, the method comprising:
   supplying a manifold with the reductant;
   flowing the reductant unidirectionally from an inlet of the manifold, circumferentially around the manifold, and to an outlet of the manifold located near the inlet; and
   injecting at least a portion of the reductant from the manifold into the exhaust stream through a plurality of orifices at substantially the same reductant pressure.

17. The method of claim 16, further including controlling supply of the reductant based on a temperature of the exhaust stream.

18. The method of claim 16, further including controlling supply of the reductant based on a load and a speed of the engine.

19. The method of claim 16, further including controlling supply of the reductant based on a pressure of the supply of the reductant.

* * * * *